United States Patent [19]
Porter

[11] 3,918,599
[45] Nov. 11, 1975

[54] SAFETY AND SECURITY DEVICE
[76] Inventor: James A. Porter, Rte. 1, Box 255, Farmington, Mo. 63640
[22] Filed: Feb. 3, 1975
[21] Appl. No.: 546,269

[52] U.S. Cl. .................... 214/454; 24/223; 70/230; 70/259; 224/42; 224/25; 248/203; 403/21
[51] Int. Cl.² .......................................... B62D 43/04
[58] Field of Search ............ 24/222 BS, 223, 224 R; 70/230, 259; 85/8.9; 214/454; 224/42.23, 42.25; 248/59, 203, 317, 327; 292/343; 403/10, 11, 21, 263

[56] References Cited
UNITED STATES PATENTS

| | | | |
|---|---|---|---|
| 1,641,890 | 9/1927 | Jackson | 214/454 |
| 1,718,249 | 6/1929 | Morin | 312/35 |
| 2,422,693 | 6/1947 | McArthur | 24/223 |
| 3,700,020 | 10/1972 | Wallace | 151/41.7 |
| 3,735,883 | 5/1973 | Hrivnyak | 214/454 |
| 3,747,541 | 7/1973 | Reese | 109/50 |
| 3,826,115 | 7/1974 | Davis | 70/258 |

Primary Examiner—Albert G. Craig, Jr.
Attorney, Agent, or Firm—Polster and Polster

[57] ABSTRACT

A safety and security device in combination with a rack by which a spare tire is mounted to the underframe of a vehicle, the rack having an arm with a keyhole slot in it and an eye bolt swingably mounted on the vehicle frame, having an eye on its lower end, includes a plug, tapered convergently downwardly, of a size to pass downwardly only part way through a large opening of the keyhole slot and to seat therein, the lower part of the plug, projecting below the arm, having a passage transversely through it, and a lock with a shackle with a segment projecting through the plug passage and a segment projecting through the rack-bolt eye.

5 Claims, 6 Drawing Figures

U.S. Patent  Nov. 11, 1975  3,918,599
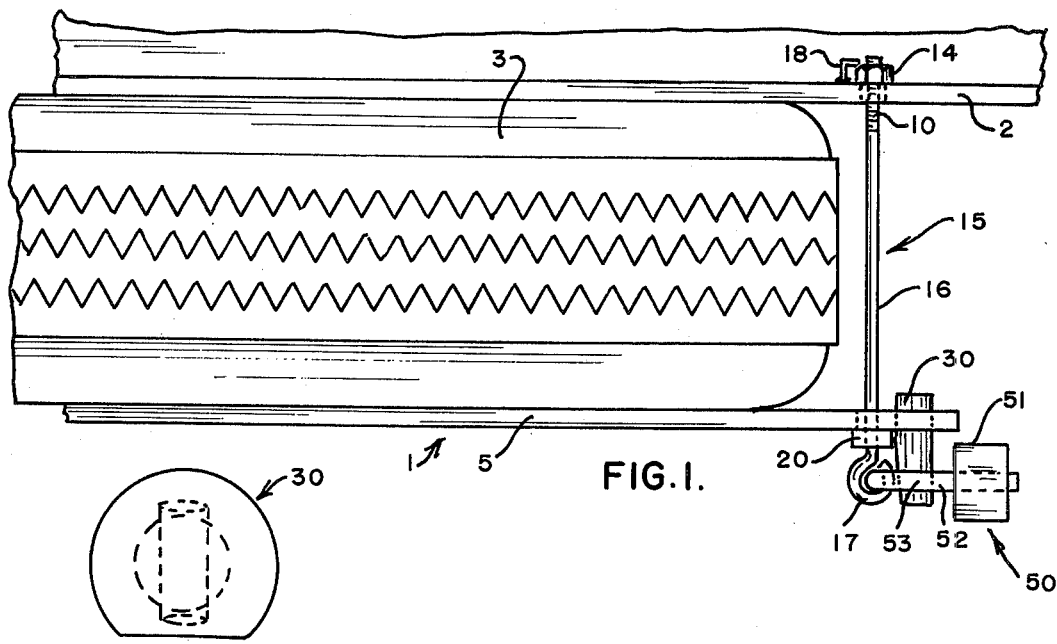
FIG. 1.
FIG. 2.
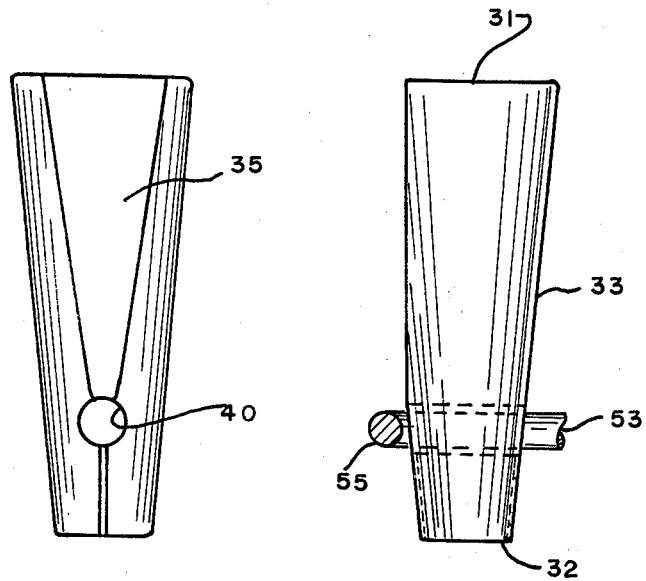
FIG. 3.  FIG. 4.
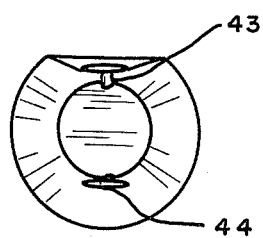
FIG. 5.
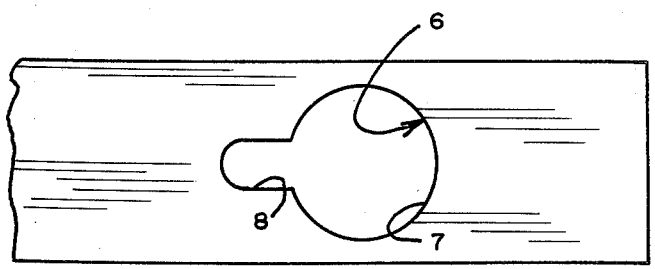
FIG. 6.

SAFETY AND SECURITY DEVICE

BACKGROUND OF THE INVENTION

Trucks and campers commonly have a spare tire rack on the underframe of the vehicle, on which a spare tire is mounted. The rack includes a hinged arm, on which the spare tire rests. At its free end, the arm has in it a keyhole slot. An eye bolt, with an eye at its lower end, and a shank threaded at its upper end into a nut mounted on the underframe, is swingably mounted at its upper end on the frame of the vehicle.

An annular shoulder is mounted or formed on the shank above the eye. The large opening of the keyhole slot is big enough to pass the shoulder and eye. The slot portion of the keyhole slot is wide enough to admit the shank, but too narrow to permit the passage of the shoulder.

The present arrangement has two disadvantages. If the bolt loosens or the tire deflates sufficiently to produce play between the arm and the tire, when the vehicle is traversing a rough road, the eye bolt can swing to the place at which the shoulder clears the keyhole and permits the arm to drop down and the tire to fall off. There is no effective way to lock the rack against tampering. If a lock is put in the lower eye of the eye bolt, the rack can still be dropped down far enough to permit the tire to be removed.

One of the objects of this invention is to provide a safety and security device which is inexpensive, simple, rugged and effective.

Another object is to provide such a device which can easily be removed and installed even under the most adverse of weather conditions.

Other objects will become apparent to those skilled in the art in the light of the following description and accompanying drawing.

SUMMARY OF THE INVENTION

In accordance with this invention, generally stated, in a vehicle with a rack by which a spare tire is mounted on the underframe of the vehicle, the rack including an arm having a keyhole slot in it and an eye bolt swingably mounted on the frame at one end and depending therefrom, the eye bolt having an eye on its lower end and a shank threaded through at least a part of its length, and an annular shoulder above the eye, the keyhole slot being of a size in a larger part to pass the shoulder and eye and in a smaller part to admit the shank but to prevent passage of the shoulder, in combination with the arm and eye bolt, an elongated plug is provided, the plug having an upper part of a size too large to pass through the large part of the keyhole slot and a lower part of a size to pass through the large part of the keyhole slot but too large to pass through the smaller part of the keyhole slot, the lower part having a passage extending transversely entirely therethrough, and lock means mounted on and carried by the plug, the lock means having a shackle with a straight portion of a size to pass through the passage and a cross portion of a size to pass through the eye, the plug projecting through the large part of the keyhole slot a distance sufficient to permit the shackle to extend through the passage and through the eye.

In the preferred embodiment, the plug is tapered convergently downwardly, has at least one flat face through at least part of its length, the flat face being perpendicular to the long axis of the passage, and the plug is provided with at least one locating channel extending from a lower end of the plug to the passage.

BRIEF DESCRIPTION OF THE DRAWINGS

In the drawings, FIG. 1 is a fragmentary view in side elevation of one illustrative embodiment of safety and security device of this invention;

FIG. 2 is a top plan view of a plug constituting a part of the safety and security device of this invention;

FIG. 3 is a view in side elevation of the plug shown in FIG. 2;

FIG. 4 is a view in side elevation 90° from the view in FIG. 3;

FIG. 5 is a bottom plan view of the plug shown in FIGS. 2 through 4; and

FIG. 6 is a fragmentary top plan view of the free end of the rack arm shown in FIG. 1, showing the keyhole slot therein.

DESCRIPTION OF THE PREFERRED EMBODIMENT

Referring now to the drawing for one illustrative embodiment of safety and security device of this invention, Referring now to the drawing for one illustrative embodiment of safety and security device of this invention, reference numeral 1 indicates a conventional spare tire rack mounted on an underframe 2 of a vehicle such as a truck or camper, by which a spare tire 3 is mounted. The rack 1 includes an arm 5 hinged to the underframe at one end, not here shown, and provided near its free end with a keyhole slot 6, which includes an enlarged, circular part 7 and a relatively narrow slot 8. An eye bolt 15, with a shank 16 is swingably mounted on the underframe 2, a threaded upper end 10 of the shank 16 extending through a hole in the underframe and having a retaining and adjusting nut 14 threaded on the end 10. The hole through which the bolt extends is sufficiently large to permit limited swinging movement of the eye bolt, as is described hereinafter, and the nut 14 is positioned and held against rotation by a clip 18. At its lower end, the eye bolt 15 has an annular shoulder 20 and below the shoulder 20, an eye 17. The shoulder 20, eye 17, and shank 16 are of a size to pass through the enlarged part 7 of the keyhole slot 6, with a part of the eye 17 projecting through the narrow slot 8, the shank 16 fits easily within the slot 8, and the shoulder 20 will not pass through the slot 8, bearing on the underside of the arm 5 on the margins of the arm outboard of the slot. All of these elements are conventional.

In the embodiment of this invention shown, a plug 30 seats in the enlarged opening 7. The plug 30 of this embodiment is truncatedly conical, tapering from a large upper end 31 to a small lower end 32. In this embodiment, a side wall 33 is interrupted by a flat 35, which extends from the upper end 31 to an edge of a passage 40, which extends diametrically entirely through the plug near its lower end 32.

Also, in this embodiment, a pair of locating channels 43 and 44 interrupt the side wall 33, extending from the lower end 32 to the passage 40, as shown particularly in FIGS. 3 and 5.

A padlock 50 of the usual key-operated type has a body 51 and a shackle 52. The shackle 52 of this embodiment has straight segments 53 and a cross-segment 55 which passes through the lower eye 17 of the eye bolt 15, as shown particularly in FIG. 1.

As can be seen from FIG. 1, the lower part of the plug 30, is sized to pass through the opening 7 and to permit the lower end of the plug to extend to the position at which the lock can be put into place.

The flat face 35 serves a double function. First, and more importantly, it permits the plug to seat safely in the opening 7, while clearing the shoulder 20. Without the flat 35, the plug would either have to be made sufficiently small to let the plug rattle in the seat or be formed with a head or offset of some sort. The latter is more difficult to fabricate. The second function of the flat 35 is to orient the passage 40 during its forming. The channels 43 and 44 are locating channels. If the passage 40 is to be made by using a drill press, for example, the plug can be placed with the flat 35 down, and the drill introduced at the end of the locating channel on the side opposite the flat. The passage 40 will then be properly located longitudinally and diametrically, and will be perpendicular to the flat 35, which is the desired orientation of the passage. If, for some reason, it is desired to orient the hole at a different angle to the flat 35, it is a simple matter to provide a jig or fixture in which the flat 35 is used as a reference plane against some stop.

As will be apparent from a consideration of FIG. 1, the provision of the flat 35 ensures that, in spite of the taper of the plug, the shoulder 20 can not pass through the opening 7 when the plug is in place. The bolt 15 can not turn, because of the shackle's extending through the eye. With this arrangement, the tire can not be lost accidently, and can not be stolen unless the lock is removed or the eye bolt cut.

In installing the device of this invention, the tire and rack are mounted in the usual way, by swinging the tire and arm up into place, pushing the lower end of the eye bolt to one side to permit its passage through the large part of the keyhole slot, moving the shank of the bolt into the narrow slot and turning the bolt to screw the bolt into the nut 14 until the shoulder 20 is tight against the under side of the arm. The plug 30 is then dropped into the opening 7 with the flat 35 toward the shoulder 20, and the shackle of the lock is run through the eye and through the passage 40, and locked in the body 50. The shackle can be of the hasp variety, permanently mounted at one end in the lock body, or of the separate U-shaped rachet type. In fact, the shackle can be L or J-shaped, so long as it projects through the eye sufficiently to preclude its being swung out of the way.

In dismounting, the opposite procedure is followed. It is to be noted that when the rack is encased in ice, which frequently happens, the plug can either be heated or the lock first rapped with a tool to free the shank from the passage and then the lower end of the plug rapped to free the plug. The taper of the plug makes removal under these circumstances easy, and its replacement, also.

Numerous variations in the construction of the device of this invention, within the scope of the appended claims, will occur to those skilled in the art in the light of the foregoing disclosure. The keyhole of the lock body can be sealed against the ingress of water and dirt by means of silicone "putty", known commercially as Silly Putty, which can be removed easily, or through which it has been found that a key can be inserted without damage to the lock. The specific shape of the plug can be varied. For example, the plug can be made pyramidal, with any number of sides from three upward, and may, as has been indicated, be made with a somewhat mushroom shape, although the shape of the preferred embodiment described has a number of advantages, both in manufacture and use. The plug can, of course, be made of any desired size to suit the dimensions of the elements of the rack, and the orientation of the through passage in the plug can be varied to suit the position and angular orientation of the eye. The shoulder of the eye bolt can be constituted by a nut threaded on a threaded section of the eye bolt immediately above the lower eye. These variations are merely illustrative.

Having thus described the invention, what is claimed and desired to be secured by Letters Patent is:

1. In a vehicle with a rack by which a spare tire is mounted on the underframe of the vehicle, said rack including an arm upon which said tire is supported, said arm having a keyhole slot in it and said rack including an eye bolt swingably mounted on said frame at one end and depending therefrom, said eye bolt having an eye on its lower end and a shank threaded through at least a part of its length and a a shoulder on said shank above said eye, said keyhole slot being of a size in a larger part to pass said shoulder and eye and in a smaller part to admit said shank but to prevent passage of said shoulder, the improvement comprising in combination with said arm and said eye bolt, an elongated plug, said plug having an upper part of a size too large to pass through said large part of the keyhole slot and a lower part of a size to pass through said large part of the keyhole slot but too large to pass through the said smaller part of the keyhole slot, said lower part having a passage extending transversely entirely therethrough; and lock means mounted on and carried by said plug, said lock means having a shackle with a straight segment of a size to pass through said passage, and a cross segment of a size to pass through said eye, said plug projecting through said large part of the keyhole slot a distance sufficient to permit said shackle to extend through the said passage and said eye.

2. The improvement of claim 1 wherein the said plug is tapered convergently downwardly.

3. The improvement of claim 2 wherein the said plug is provided with at least one flat face through at least part of its length.

4. The improvement of claim 3 wherein said flat face is perpendicular to the long axis of said passage.

5. The improvement of claim 4 wherein the plug is provided with at least one locating channel extending from a lower end of said plug to said passage.

* * * * *